United States Patent
Nakanishi et al.

(10) Patent No.: US 7,510,792 B2
(45) Date of Patent: Mar. 31, 2009

(54) FUEL CELL WITH A TENSION IN AN IN-PLANE DIRECTION

(75) Inventors: Haruyuki Nakanishi, Susono (JP); Shinichi Matsumoto, Fuji (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 11/026,411

(22) Filed: Jan. 3, 2005

(65) Prior Publication Data

US 2005/0147870 A1 Jul. 7, 2005

Related U.S. Application Data

(63) Continuation of application No. PCT/JP03/07562, filed on Jun. 13, 2003.

(30) Foreign Application Priority Data

Jul. 15, 2002 (JP) .............................. 2002-205012

(51) Int. Cl.
*H01M 8/00* (2006.01)
*H01M 8/10* (2006.01)
*H01M 2/00* (2006.01)
*H01M 2/02* (2006.01)

(52) U.S. Cl. .............................. 429/12; 429/34; 429/37

(58) Field of Classification Search ....................... None
See application file for complete search history.

(56) References Cited

U.S. PATENT DOCUMENTS

| | | | | |
|---|---|---|---|---|
| 4,345,009 A | * | 8/1982 | Fahle et al. ................... | 429/37 |
| 5,686,200 A | * | 11/1997 | Barton et al. .................. | 429/37 |
| 6,007,933 A | | 12/1999 | Jones | |
| 6,040,072 A | * | 3/2000 | Murphy et al. ................ | 429/12 |
| 6,461,756 B1 | * | 10/2002 | Blanchet et al. ............... | 429/37 |

FOREIGN PATENT DOCUMENTS

| | | |
|---|---|---|
| EP | 1 278 260 A1 | 1/2003 |
| JP | 06-168728 | 6/1994 |
| JP | 2001-160405 | 6/2001 |
| JP | 2002-050367 | 2/2002 |
| WO | WO0219454 A1 | 3/2002 |

* cited by examiner

*Primary Examiner*—Patrick Ryan
*Assistant Examiner*—Julian Mercado
(74) *Attorney, Agent, or Firm*—Kenyon & Kenyon LLP

(57) ABSTRACT

A fuel cell includes a diffusion layer formed in a sheet having a small thickness. The fuel cell is assembled with a tension imposed on the sheet in an in-plane direction of the sheet. The tension is imposed on the diffusion layer from a frame disposed outside the fuel cell. The tension is of such a magnitude as to prevent a portion of the sheet positioned corresponding to a gas passage of a separator from being deformed when the fuel cell is assembled and has a tightening force thereby applied thereto. The tension is adjustable according to a fuel cell operating condition. These structures can prevent a separator rib from pushing into a membrane, maintaining the gas passability of the diffusion layer well.

15 Claims, 3 Drawing Sheets

FUEL CELL WITH A TENSION IN AN IN-PLANE DIRECTION

This is a continuation of International Patent Application No. PCT/JP2003/007562 filed 13 Jun. 2003, which claims priority to JP-2002-205012 filed 15 Jul. 2002, the contents of which are incorporated herein.

FIELD OF THE INVENTION

The present invention relates to a fuel cell. More particularly, the present invention relates to a diffusion electrode of a polymer electrolyte fuel cell.

BACKGROUND OF THE INVENTION

A polymer electrolyte fuel cell (PEFC) includes a membrane-electrode assembly (MEA) and a separator. At least one layer of the fuel cell forms a module and a number of modules are piled.

The MEA includes an electrolyte membrane, a first electrode (an anode) including a catalyst layer and a diffusion layer disposed on one side of the electrolyte membrane, and a second electrode (a cathode) including a catalyst layer and a diffusion layer disposed on the other side of the electrolyte membrane. In separators disposed on opposite sides of the MEA, a fuel gas passage for supplying fuel gas (e.g., hydrogen) to the anode and an oxidant gas passage for supplying oxygen gas (e.g., oxygen, usually, air) to the cathode are formed. In order to cool the fuel cell, a coolant (e.g., water) passage is formed per one fuel cell or a plurality of fuel cells in the separators. The separator constructs an electron current passage between adjacent fuel cells.

Electrical terminals, electrical insulators, and end plates are disposed at opposite ends of the pile of modules. The pile of modules are tightened between the opposite end plates in a fuel cell stacking direction and the opposite end plates are coupled to a fastening member (for example, a tension plate) extending in the fuel cell stacking direction outside the pile of fuel cells, by bolts and nuts to form a stack of fuel cells.

In the PEFC, at the anode, hydrogen is changed to positively charged hydrogen ions (i.e., protons) and electrons. The hydrogen ions move through the electrolyte membrane to the cathode where the hydrogen ions react with oxygen supplied and electrons (which are generated at an anode of the adjacent MEA and move to the cathode of the instant MEA through a separator, or which are generated at an anode of a fuel cell located at a first end of the pile of fuel cells and move to a cathode of a fuel cell located at a second, opposite end of the pile of fuel cells through an external electrical circuit) to form water as follows:

At the anode: 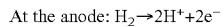

At the cathode: 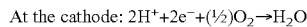

Such a conventional PEFC is disclosed in, for example, Japanese Patent Publication 2002-50367. In the conventional PEFC, usually, the diffusion layer (gas diffusion layer) is made from at least one layer of carbon cloth or carbon paper.

However, in the conventional fuel cell, there is the following problem:

Since the diffusion layer made from layered of carbon cloths or carbon papers is low in rigidity, and the electrolyte membrane and the catalyst layer are also low in rigidity, a rib (a convex of convex and concave portions) of the gas passage of the separator intrudes on or pushes into the diffusion layer (see, e.g., region A of FIG. 6), resulting in a bending deformation of the diffusion layer and the electrolyte membrane. As a result, durability of portions of the diffusion layer and the electrolyte membrane where corners (shoulders) of the ribs of the separator contact the diffusion layer decreases, accompanied by a decrease in durability of the fuel cell.

In order to increase a rigidity of the diffusion layer thereby preventing the diffusion layer from pushing into the membrane due to pressure from the separator, it might be effective to make the diffusion layer from a wire netting or a composite carbon paper (a composite of carbon and phenol resin.

However, with the wire netting, there are problems of corrosion of the wire netting, degradation of the membrane due to the corrosion of the wire netting, and an increase in a manufacturing cost. Further, with the composite carbon paper, there is a problem that a portion of the diffusion layer compressed by the rib of the separator is collapsed and gas cannot flow through the collapsed portion of the diffusion layer.

SUMMARY OF THE INVENTION

An object of the present invention is to provide a fuel cell which can prevent a rib of a separator from deforming a membrane whereby gas passability of a diffusion layer can be kept well.

A fuel cell according to the present invention to achieve the above object is as follows:
(1) The fuel cell of the present invention includes a diffusion layer formed in a sheet having a small thickness like a membrane. In the fuel cell, there is a tension imposed on the sheet in an in-plane direction of the sheet. The tension may act in a direction substantially perpendicular to a tightening force associated with assembly of the fuel cell.
(2) In the fuel cell according to item (1) above, the tension is imposed on the diffusion layer in a direction perpendicular to a separator gas passage.
(3) In the fuel cell according to item (1) above, the tension is imposed on the diffusion layer from a frame disposed outside the fuel cell.
(4) In the fuel cell according to item (1) above, the diffusion layer is fixed to a separator by an adhesive with the tension imposed on the sheet.
(5) In the fuel cell according to item (1) above, the tension is of such a magnitude as to prevent a portion of the sheet positioned corresponding to a gas passage of a separator from being deformed when the fuel cell is tightened.
(6) In the fuel cell according to item (1) above, the tension is adjustable according to a fuel cell operating condition.
(7) In the fuel cell according to item (1) above, the tension is adjusted to a first, small magnitude during a start-up of the fuel cell from a low temperature and is adjusted to a second, large magnitude larger than the first magnitude during a constant operation of the fuel cell.

In the fuel cell according to items (1)-(7) above, since a tension directed in the in-plane direction of the sheet acts in the sheet in a tightened state of the fuel cell, a rigidity of the diffusion layer is increased so that when the diffusion layer is pressed at a fuel cell tightening pressure by a separator rib, the rib does not push into or is unlikely to push into the diffusion layer and the membrane. As a result, there is no or little damage in the membrane due to pressure from the rib. Further, due to an increase in the rigidity due to the tension, the diffusion layer is not collapsed beneath the rib. As a result, even if the tension is imposed on the diffusion layer, gas passability of the diffusion layer is maintained well.

In the fuel cell according to item (2) above, since the tension is imposed on the diffusion layer in a direction perpendicular to a separator gas passage, intrusion of the separator rib into the diffusion layer and the membrane can be effectively prevented.

In the fuel cell according to items (6) and (7) above, since a magnitude of the tension is adjustable according to the fuel cell operating condition, by adjusting the tension to a small magnitude during a start-up of the fuel cell from a low temperature, the electric conductivity between the diffusion layer and the membrane can be decreased thereby increasing heat generation due to an increase in a contact resistance, and by adjusting the tension to a large magnitude during a constant fuel cell operation, the electric conductivity between the diffusion layer and the membrane can be increased.

BRIEF DESCRIPTION OF THE DRAWINGS

A fuel cell according to the present invention will now be explained with reference to the accompanying drawings, in which.

DETAILED DESCRIPTION OF THE PREFERRED EMBODIMENTS

Figure 4:
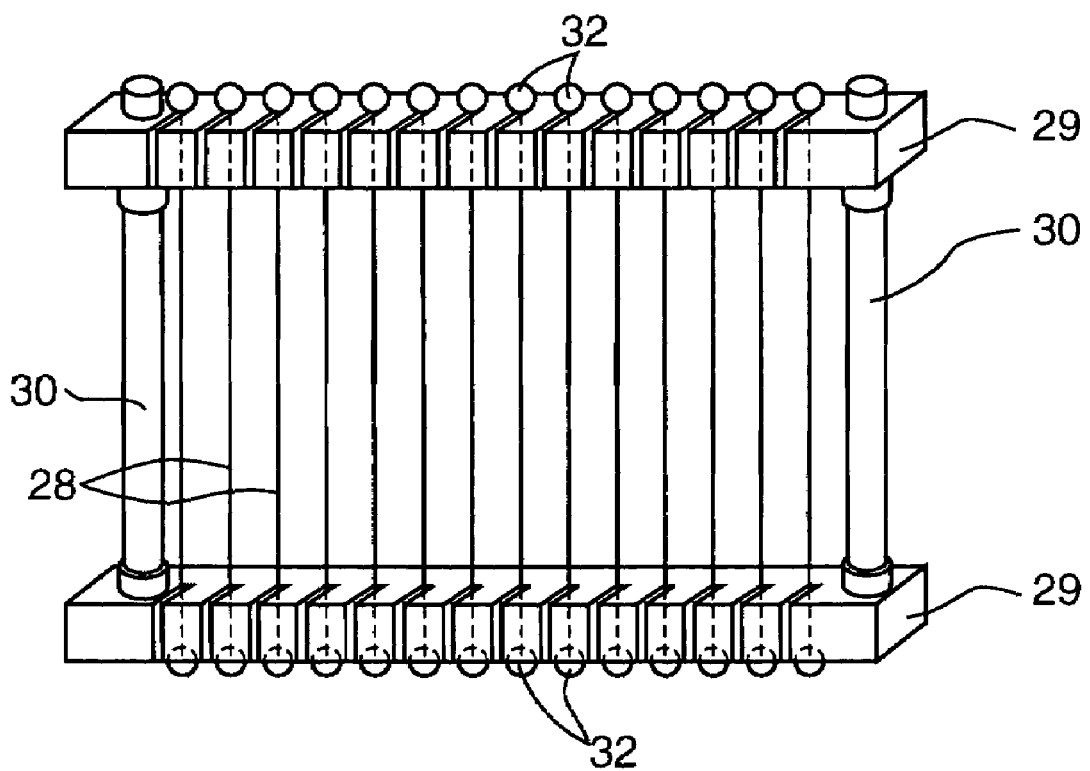
FIG. 4 is a perspective view of a thread and a frame for imposing a tension on a textile of a diffusion layer of the fuel cell according to the present invention.
Figure 5:
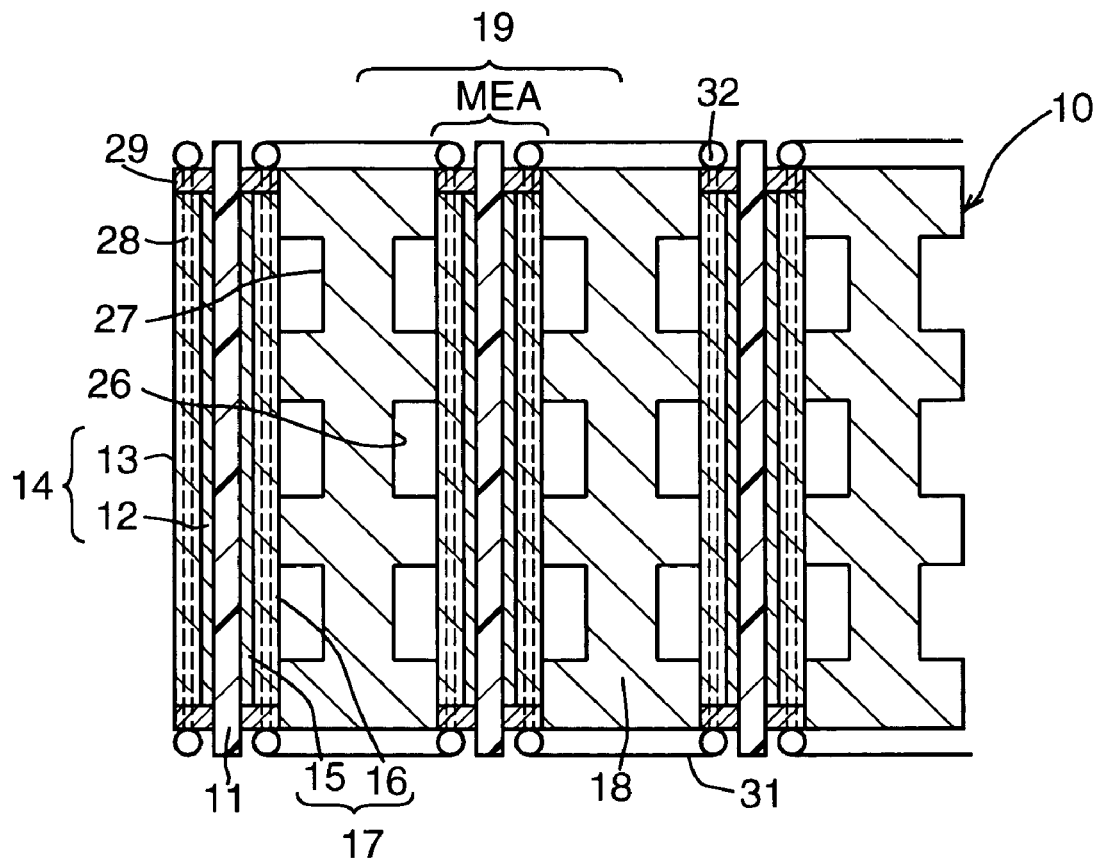
FIG. 5 is an enlarged cross-sectional view of a portion of the stack of fuel cells according to the present invention.
Figure 6:
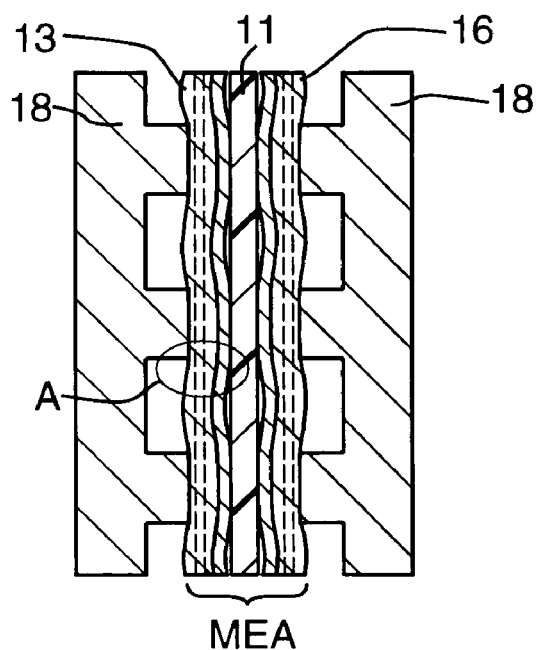
FIG. 6 is an enlarged cross-sectional view of a portion of a conventional fuel cell.

With reference to FIGS. 1-6 (FIG. 6 illustrates a fuel cell of a comparison or a conventional fuel cell), a fuel cell according to the present invention will be explained below.

The fuel cell according to the present invention is a polymer electrolyte fuel cell (PEFC) 10. The fuel cell 10 is mounted to, for example, a vehicle. However, the fuel cell 10 may be used in an environment other than a vehicle.

Figure 1:
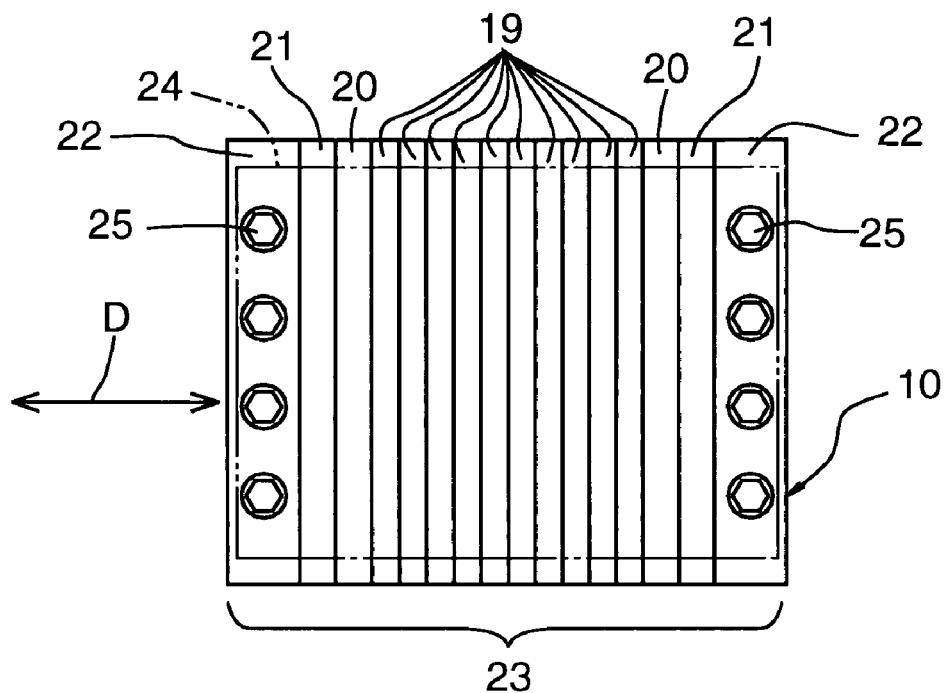
FIG. 1 is a schematic side elevational view of a stack of fuel cells according to the present invention.
Figure 2:
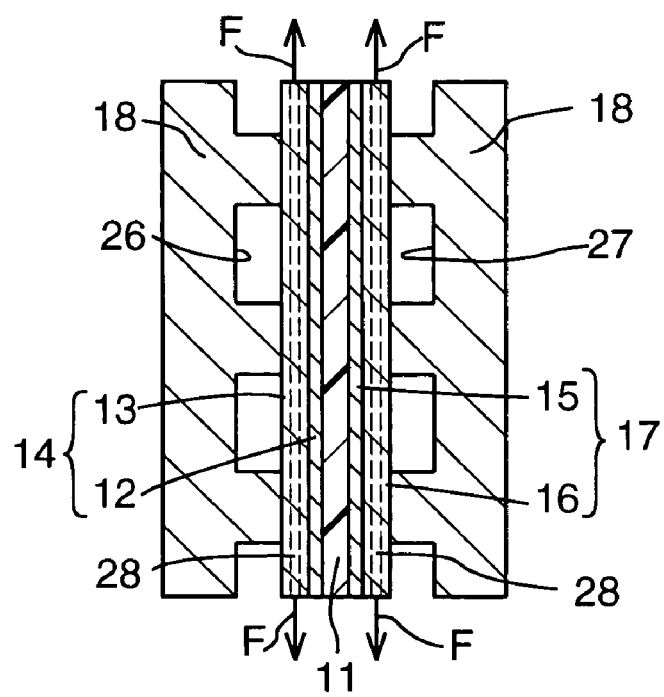
FIG. 2 is an enlarged cross-sectional view of a portion of a fuel cell according to the present invention.

As illustrated in FIGS. 1 and 2, the polymer electrolyte fuel cell 10 includes a membrane-electrode assembly (MEA) and a separator 18 layered to the MEA. At least one fuel cell forms a fuel cell module 19, and a plurality of fuel cell modules are piled.

The MEA includes an electrolyte membrane 11 made from an ion exchange membrane, a first diffusion electrode 14 (anode) including a catalyst layer 12 and a diffusion layer 13 disposed on one side of the electrolyte membrane, and a second diffusion electrode 17 (cathode) including a catalyst layer 15 and a diffusion layer 16 disposed on the other side of the electrolyte membrane.

Electrical terminals (terminal plates) 20, electrical insulators 21, and end plates 22 are disposed at opposite ends of the pile of fuel cell modules. The end plates are coupled by bolts 25 to fastening members (for example, tension plates 24) which extend in a longitudinal direction (fuel cell module piling direction) of the pile of fuel cell modules outside the pile of the fuel cell modules, and the fuel cell modules are tightened in the longitudinal direction D (see FIG. 1) of the pile of fuel cell modules and, together with the members 20, 21, 22 and 24, construct a fuel cell stack 23.

In an anode-side separator of a pair of separators opposing each other via the MEA, a fuel gas passage 26 for supplying fuel gas (e.g., hydrogen) to the anode 12 is formed. In a cathode-side separator of the pair of separators opposing each other via the MEA, an oxidant gas passage 27 for supplying oxidant gas (e.g., oxygen, usually, air) to the cathode 14 is formed. Further, in the separator 18, a coolant passage for cooling the fuel cell is formed each fuel cell or each plurality of fuel cells. For example, in FIG. 2, the coolant passage is formed in a surface of the separator 18 opposite an MEA contacting surface of the separator. The separator 18 separates the coolant from the fuel gas or the oxidant gas, or separates the fuel gas from the oxidant gas. The separator 18 operates as an electricity current passage between the anode and the cathode of adjacent fuel cells.

When the diffusion layers opposing each other via the separator are electrically conductive by use of a conductive member 31 to connect the diffusion layers as illustrated in FIG. 5, the separator 18 can be non-conductive.

The diffusion layer 13 is formed in a sheet having a small thickness like a membrane (a thin sheet). The catalyst layer 12 can be coated on an MEA opposing surface of the diffusion layer 13 so that the catalyst layer 12 and the diffusion layer 13 form the thin sheet, or the catalyst layer 12 can be coated on the membrane 11 so that the diffusion layer 13 is a layer separate from the catalyst layer 12.

Similarly, the diffusion layer 16 is formed in a sheet having a small thickness like a membrane (a thin sheet). The catalyst layer 15 can be coated on an MEA opposing surface of the diffusion layer 16 so that the catalyst layer 15 and the diffusion layer 16 form the thin sheet, or the catalyst layer 15 can be coated on the membrane 11 so that the diffusion layer 16 is a layer separate from the catalyst layer 15.

As illustrated in FIG. 2, a tension (tension force) F of a specified magnitude directed in an in-plane direction of the sheet (a direction parallel to a major surface of the sheet) is applied in a fuel cell assembled and tightened as described above. The fuel cell stack is tightened keeping the state where the tension F acts in the diffusion layer 13, 16. This condition that "the fuel cell stack is tightened keeping the state where the tension F acts in the diffusion layer 13, 16" includes a case where, in keeping the state where the tension F is imposed on the diffusion layer 13, 16, the diffusion layer 13, 16 is fixed to a separator 18 by an adhesive, and then the separator fixed with the diffusion layer 13, 16 and the membrane 11 or the MEA are layered and are tightened. More specifically, the diffusion layer 13, 16 may be affixed to a separator 18, for example by an adhesive, in such a way that the tension F is imposed on (or applied to) the diffusion layer 13, 16. Then, the separator layer 18 with the diffusion layer 13, 16 affixed thereto may be included in the assembly of fuel cell modules 19.

FIG. 5 illustrates a state where the fuel cell modules 19 are layered in a longitudinal direction of a pile of fuel cell modules and a tightening load is not yet imposed on the pile of fuel cell modules. FIG. 2 illustrates a state where a tightening load is imposed on the pile of fuel cell modules, which is substantially the same as the state of FIG. 5 when a tightening force is not yet imposed. FIG. 2 illustrates a portion of one fuel cell module in an enlarged cross section.

In the case where the diffusion layers 13 and 16 opposing each other via the separator 18 are electrically connected to each other by a conductive member 31, the separator 18 can be electrically non-conductive.

The tension is imposed on the diffusion layer 13, 16 in a direction perpendicular to the gas passage 26, 27 formed in the separator 18 which the diffusion layer 13, 16 contacts. For example, in FIG. 3, when the gas passage 26, 27 (not shown in FIG. 3) extends in a right and left direction of FIG. 3, the tension F directed in an up-and-down direction of FIG. 3 is imposed on the diffusion layer 13, 16 (not shown in FIG. 3).

Figure 3:
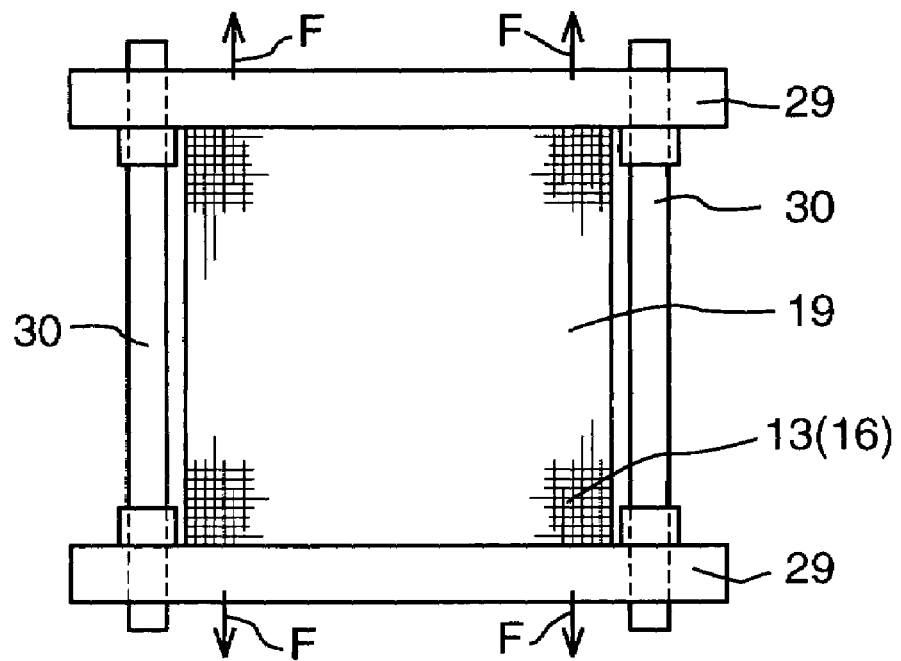
FIG. 3 is an elevational view of the fuel cell according to the present invention.

One example of a method of imposing the tension on the diffusion layer 13, 16 is illustrated in FIGS. 3 and 4. In the method, opposite ends of threads (e.g., carbon threads) 28 constituting a textile of the sheet of diffusion layer 13, 16 are fixed to (e.g., bound to or bonded to) frames 29 (an upper frame and a lower frame) disposed outside the fuel cell, and by moving the frames 29 in a direction away from each other by using a support pole 30 to separate the frames 29 so that a tension is imposed on the diffusion layer 13, 16. More particularly, a right-hand thread is formed in one end portion of the support pole and a left-hand thread is formed in the other end portion of the support pole, and by rotating the support pole about an axis of the support pole, the frames 29 are moved in a direction away from each other or closer to each other. By rotating the support pole 30 in such a rotational direction as to move the frames 29 away from each other, the frames are moved apart so that the tension is imposed on the diffusion layer 13, 16. When the tension force imposed on the diffusion layer 13, 16 is directed in an up-and-down direction in FIG. 3, the threads on which the tension is imposed are directed in the up-and-down direction in FIG. 3.

When the threads 28 are bound to the frame 29, as illustrated in FIG. 4, preferably, knots or expanded portions 32 are formed in opposite ends of some or all of the threads 28. Then, letting portions of the threads other than the knots or expanded portions extend through the slits or holes formed in the frames 29 and letting the knots or expanded portions 32 engage outboard surfaces of the frames 29, the threads 28 can be fixed to the frames 29 and extend in a direction of the applied tension.

The tension imposed on the diffusion layer 13, 16 is of such a magnitude as to prevent a portion of the sheet positioned corresponding to a gas passage of a separator from being deformed, that is, the tension prevents the ribs of the gas passage of the separator 18 from pushing into the membrane 11, when the fuel cell is tightened.

The tension F imposed on the diffusion layer 13, 16 may be adjustable according to an operating condition of the fuel cell. It is easy to adjust the tension F in the case where the threads 28 are bound to the frames 29.

When the tension F is adjusted according to the fuel cell operating condition, it is preferable that the tension is adjusted to a first, small magnitude during a start-up of the fuel cell from a low temperature and the tension is adjusted to a second, large magnitude larger than the first magnitude during a constant operation of the fuel cell.

FIG. 6 illustrates a conventional state where a tension is not imposed on a diffusion layer. FIG. 2 illustrates a state according to the present invention where the tension is imposed on the diffusion layer.

In the state where the tension is small, the state according to the present invention becomes close to the state of FIG. 6. In the state where the tension is small, a contact pressure between the diffusion layer 13, 16 and a rib of the separator 18 is small so that the electric conductivity of the electrode diffusion layer 13, 16 decreases whereby heat generation is promoted, and the electrode diffusion layer 13, 16 is deformed in a direction away from the membrane 11 at a portion where the electrode diffusion layer 13, 16 is not pressed by the separator rib (see, e.g., region A of FIG. 6) and a heat is collected in that portion. As a result, the fuel cell is smoothly activated during start-up of the fuel cell from a low temperature and can be smoothly shifted to a constant output operation.

In the constant operation of the fuel cell where the tension is large, as illustrated in FIG. 2, a rigidity of the electrode diffusion layer 13, 16 is large, so that a rib of the separator 18 does not push into and deform the diffusion layer 13, 16 and the membrane 11, and the contact pressure between the diffusion layer and the separator rib is large whereby the conductivity is improved.

Effects of the fuel cell according to the present invention will now be explained.

Since the tension F is imposed on the diffusion layer 13, 16, as illustrated in FIG. 2, the rigidity of the electrode diffusion layer is increased. As a result, the separator rib is unlikely to push into the electrode diffusion layer 13, 16 and the membrane 11, and damage to the membrane 11 at a portion corresponding to the shoulder corner of the separator rib (a portion A in FIG. 6) is reduced. If the membrane 11 is damaged, the fuel gas leaks into the oxidant gas and is oxidized to generate heat to further damage the membrane 11. Contrarily, in the present invention, since little damage occurs in the membrane 11, such leakage of the fuel gas and heat generation due to the leakage do not occur. As a result, durability of the fuel cell is improved.

Since the improvement of the durability of the fuel cell is performed by imposing the tension on the diffusion layer 13, 16, a density of the diffusion layer 13, 16 does not need to be raised. Further, since the separator rib is unlikely to push into the diffusion layer 13, 16, the density of the portion of the diffusion layer beneath the separator rib is not raised due to being collapsed from the pressure of the separator rib. As a result, gas passability of the diffusion layer 13, 16 is equal to or better than a gas passability of the convention diffusion layer.

Since the tension F is imposed on the diffusion layer 13, 16 in the direction perpendicular to the gas passage 26, 27 formed in the separator when the tension F is imposed on the diffusion layer 13, 16, a portion of the diffusion layer 13, 16 between adjacent ribs of the separator is unlikely to be deformed so as to be pushed into the gas passage of the separator, so that the separator rib is unlikely to push into the diffusion layer 13, 16. As a result, the above-described intrusion of the rib into the diffusion layer and damage of the membrane 11 are effectively prevented.

Further, since the diffusion layer 13, 16 is tensioned from the frame 29 disposed outside the fuel cell, a structure in the fuel cell does not need to be changed. Further, when imposing the tension on the diffusion layer 13, 16 by pulling the frames 29 outside the fuel cell in a direction apart from each other, imposing the tension and changing the magnitude of the tension can be performed in a simple procedure.

Further, in the case where the tension is adjustable and the tension is made small during a start-up of the fuel cell from a low temperature, a start-up from a low temperature (for example, about −40° C.) becomes smooth.

The tensioned diffusion layer according to the present invention is applicable to a fuel cell.

More particularly, since the tension having a suitable magnitude is imposed on the sheet of the diffusion layer in the in-plane direction of the sheet, the rigidity of the diffusion layer is increased. As a result, when the diffusion layer is pressed by the separator rib at the fuel cell tightening pressure, the rib does not or only slightly pushes into the diffusion layer and the membrane, and there is no or little damage to the membrane. Further, since the rigidity of the diffusion layer is increased due to the tension, the diffusion layer is not collapsed to a solid layer. As a result, despite the load imposed on the diffusion layer, gas passability of the diffusion layer is maintained well.

In the case where the tension is imposed on the diffusion layer in the direction perpendicular to the separator gas passage, intrusion of the separator rib into the diffusion layer and the membrane is effectively prevented.

In the case where the tension is imposed on the diffusion layer from the frame disposed outside the fuel cell, the tension force can be imposed on the diffusion layer without changing the interior structure of the fuel cell. In addition, adjusting the tension imposed on the diffusion layer is easy.

In the case where the diffusion layer is fixed to the separator by an adhesive while the tension is imposed on the diffusion layer, the tension force can be imposed on the diffusion layer without changing the interior structure of the fuel cell.

In the case where the tension is of such a magnitude as to prevent a portion of the sheet positioned corresponding to the gas passage of the separator from being deformed when the fuel cell is tightened, the rigidity of the diffusion layer can be increased without breaking the sheet of the diffusion layer.

In the case where the tension is adjustable according to the fuel cell operating condition, by adjusting the tension to a small magnitude during a start-up of the fuel cell from a low temperature, the electric conductivity between the diffusion layer and the membrane can be decreased thereby increasing heat generation due to an increase in a contact resistance, and by adjusting the tension to a large magnitude during a constant fuel cell operation, the electric conductivity between the diffusion layer and the membrane can be increased.

It will be understood that other embodiments of the invention will be readily apparent to a person skilled in the art, the scope of the invention being defined in the appended claims.

The invention claimed is:

1. A fuel cell including a diffusion layer wherein a tension is a pulling force applied directly to said diffusion layer in only an in-plane direction of said diffusion layer so as to be directed outwardly.

2. A fuel cell according to claim 1, wherein the tension is applied to said diffusion layer in a direction perpendicular to a separator gas passage.

3. A fuel cell according to claim 1, wherein the tension is applied to said diffusion layer from a frame disposed outside said fuel cell.

4. A fuel cell according to claim 1, wherein said diffusion layer is fixed to a separator by an adhesive with the tension applied to said diffusion layer by fixing to the separator.

5. A fuel cell according to claim 1, wherein the tension is of such a magnitude as to prevent a portion of said diffusion layer positioned corresponding to a gas passage of a separator from being deformed.

6. A fuel cell according to claim 1, wherein the tension is adjustable according to a fuel cell operating condition.

7. A fuel cell according to claim 6, wherein the tension is adjusted to a first magnitude during a start-up of said fuel cell from a start-up temperature and is adjusted to a second magnitude larger than said first magnitude during a constant operation of said fuel cell.

8. A fuel cell comprising:
a separator;
a diffusion layer; and
an adhesive for applying and maintaining tension directly to the diffusion layer in a direction parallel to a major surface of said diffusion layer.

9. The fuel cell of claim 8, further comprising:
a separator gas passage, wherein the tension is applied to said diffusion layer in a direction perpendicular to the separator gas passage.

10. A fuel cell, comprising:
a separator having a gas passage portion;
a diffusion layer having elements for applying a pulling force to the diffusion layer;
a frame surrounding the diffusion layer and configured for fixation of the diffusion layer elements to the frame and applying a pulling force to the diffusion layer elements in a direction perpendicular to the gas passage portion of the separator.

11. The fuel cell of claim 10, wherein the frame comprises:
a lower frame opposing an upper frame, and a rotatable support element connecting the lower frame to the upper frame.

12. The fuel cell of claim 10, wherein the rotatable support element, when rotated in a first direction applies the pulling force to the diffusion layer in a direction perpendicular to the separator.

13. A method for applying a pulling force to a diffusion layer in a fuel cell, the fuel cell including a membrane, a diffusion layer, a frame including an upper frame, a lower frame and a support member, and a separator, the method comprising:
connecting elements of the diffusion layer to the frame;
imposing a pulling force on the diffusion layer in a direction perpendicular in a direction perpendicular to a gas passage portion of the separator by adjusting a support member of the frame to separate the upper frame from the lower frame; and
further adjusting the support member of the frame to further separate the upper frame from the lower frame to increase the pulling force imposed on the diffusion layer.

14. The method of claim 13, wherein the pulling force is further adjusting is according to a fuel cell operating condition.

15. The method of claim 13, wherein the pulling force is of such a magnitude as to prevent a portion of said diffusion layer positioned corresponding to a gas passage of a separator from being deformed.

* * * * *

UNITED STATES PATENT AND TRADEMARK OFFICE
CERTIFICATE OF CORRECTION

PATENT NO. : 7,510,792 B2  
APPLICATION NO. : 11/026411  
DATED : March 31, 2009  
INVENTOR(S) : Haruyuki Nakanishi et al.

Page 1 of 1

It is certified that error appears in the above-identified patent and that said Letters Patent is hereby corrected as shown below:

| <u>Column</u> | <u>Line</u> | |
|---|---|---|
| 1 | 62 | Change "layered" to --layers--. |
| 3 | 8 | Change "electric" to --electrical--. |
| 5 | 64 | Before "heat" delete "a". |
| 8 | 38 | After "perpendicular" (first occurrence) delete "in a direction perpendicular". |
| 8 | 46 | After "adjusting" delete "is". |

Signed and Sealed this

Eighteenth Day of August, 2009

David J. Kappos  
*Director of the United States Patent and Trademark Office*